United States Patent Office 3,808,131
Patented Apr. 30, 1974

3,808,131
COORDINATED METAL COMPLEXES IN LUBRICATING OILS AND HYDROCARBON FUELS
Ferdinand P. Otto, Woodbury, and Andreas Logothetis, Haddonfield, N.J., assignors to Mobil Oil Corporation
No Drawing. Original application Mar. 24, 1970, Ser. No. 22,400, now Patent No. 3,624,115. Divided and this application June 4, 1971, Ser. No. 150,207
Int. Cl. C10l 1/22; C10m 1/32, 1/36
U.S. Cl. 252—32.5   15 Claims

ABSTRACT OF THE DISCLOSURE

Coordinated metal complexes useful in lubricating oils and hydrocarbon fuels to impart detergency and neutralizing properties thereto are obtained by reacting an alkylene polyamine with a monocarboxylic acid or anhydride, followed by reacting the product thus obtained with alkenylsuccinic acid or anhydride and a metal salt.

CROSS-REFERENCE TO RELATED APPLICATIONS

This is a division of application Ser. No. 22,400, filed Mar. 24, 1970, now Pat. No. 3,624,115.

BACKGROUND OF THE INVENTION

Field of the invention

This invention relates to stabilized organic compositions containing novel additives and in particular this invention relates to organic compositions containing metal complexes.

Discussion of the prior art

It is known that in the normal use of organic industrial fluids, such as lubricating oils, transmission fluids, bearing lubricants, power transmitting fluids and the like, the base medium is subjected to oxidizing conditions which may result in the formation of sludge, lacquers, corrosive acids, and the like. These products are undesirable in the equipment in which the industrial fluid is used. The oxidation residues or heavy contaminants may interfere with the normal operation of the fluids, increase its viscosity, and even cause severe damage to the parts of the equipment themselves.

In the lubrication of modern engines, particularly, oil compositions must be able to prevent acids, sludge and other solid contaminants from remaining near the moving metal parts. Poor piston travel and excessive engine bearing corrosion may result, unless the oil can prevent the sludge and oxidation products from depositing in the engine. Bearing corrosion is another serious problem in gasoline engines which operate at an oil temperature of about 300° F. or higher.

The most desirable way of decreasing these difficulties is to add to the base organic fluid a detergent or dispersant additive capable of dispersing the solid particles to prevent them from interfering with the normal operation of the equipment, and leaving the metal surfaces relatively clean. Today, with modern equipment operating under increasingly strenuous conditions, it is desirable to develop new detergents which have improved dispersant properties, which are soluble in the fluid medium to which they are added, and which are themselves stable therein.

SUMMARY OF THE INVENTION

In accordance with the invention, there is provided a coordinated metal complex product prepared by the reaction between a basic nitrogen compound obtained by reacting an alkylene polyamine of the formula $H_2N(RNH)_zH$, wherein R is alkylene of from 2 to 5 carbon atoms with a monocarboxylic acid of from 1 to about 40 carbon atoms with (1) an alkenylsuccinic acid or anhydride, wherein the alkenyl contains from 8 to about 300 carbon atoms, and
(2) a metal salt prepared from a metal selected from the group consisting of Groups I-B, II-B, IV-A, VI-B and VIII of the Periodic Table and an acid selected from the group consisting of organosulfonic acid, organophosphorus acid, each having from 1 to about 50 carbon atoms, sulfamic acid and alkenylsuccinamic acid, the alkenyl being as hereinbefore defined.

It will be understood herefrom that (1) and (2) may be reacted with the polyamine-acid product in either of the two possible orders. That is, the order of such reactions may be (1), (2) or (2), (1). Additionally, it will be understood that the three reactants may be placed together at the same time for reaction.

The invention further provides organic fluid compositions comprising a major proportion of an organic fluid and a minor amount of the coordinated metal complex product. When used in accordance with this invention, the metal complexes may be present in the organic fluid to the extent of from about 0.05 to about 25% by weight thereof.

DESCRIPTION OF SPECIFIC EMBODIMENTS

The preferred metal-containing reagents may be prepared as metal salts of the following acids:

(1) sulfonic acids, $HR$—$SO_3$
(2) phosphoric acids, $HR_2PO_4$ or $H_2RPO_4$
(3) phosphinic or phosphonic acids,

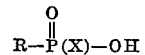

[X may be R, hydrogen, or hydroxy], and
(4) sulfamic acid, $HO$—$SO_2$—$NH_2$ wherein R is an alkyl, aryl, aralkyl or alkaryl radical having up to about 50 carbon atoms; and oxygen-, sulfur-, and nitrogen containing derivatives thereof. Although acid (4) is inorganic, nevertheless, it shares with the other acids the ability to form the stable and useful metal complexes of this invention.

The reaction between the basic organic nitrogen compound, either the amine-acid product or the amine-acid-alkenylsuccinic product, with the metal reagent is conducted at a temperature ranging from about 60° to about 250° C. under atmospheric or reduced pressure conditions. Generally, the mole ratio is from about 0.5 to about 2 moles of metal reagent per mole of nitrogen compound.

As indicated previously, the preferred metal-containing coordination complex reagent may be a metal salt of organosulfonic acids, organic phosphorus-containing acids, alkenylsuccinamic acids, or sulfamic acids. The organic portion of the first two of these is ordinarily a hydrocarbyl substituent having from 1 to 50 carbon atoms, and more preferably from 1 to 30 carbon atoms. The polyvalent metal salts of these acids, especially the divalent metals, provide suitable reagents for the products of this invention. The metal is preferably selected from Groups I-B, II-B, IV-A, VI-B, and VIII of the Periodic Table; the acceptable metals include zinc, tin, nickel, copper, cobalt, cadmium, chromium and lead. Of these the most preferred are zinc, tin and nickel.

The organophosphorus salts include metal salts of alkyl, aryl and alkaryl phosphoric acids, such as butyl phosphate, octyl phosphate, phenyl phosphate, methylphenyl phosphate, diamylphenyl phosphate, phosphosulfurized olefins and polyolefins, wherein the olefins and polyolefins may contain up to 300 carbon atoms, and the like, as well as the corresponding phosphinates and phosphonates.

Organic phosphorus compounds containing two or more phosphorus atoms may also be used. Among the organo sulfonates which may be used are such sulfonates as those derived from mineral oils, such aryl sulfonates as phenyl-sulfonate, naphthylsulfonate, tolylsulfonate, wax-benzene sulfonate, including mono- and multi-alkyl-substituted derivatives of such aryl sulfonates, and the like. The preparation of these organic phosphorus compounds and sulfonates are well known in the art.

The nitrogen compound contemplated is an alkylene polyamine of the structure $H_2N(RNH)_zH$, R being a 2- to 5-carbon alkylene group, and $z$ is 1 to 10. Included are compounds such as triethylene tetramine, tetraethylene pentamine, di(methylethylene) triamine, hexapropylene heptamine, and the like.

Utilizable as the acid to be reacted with the alkylene polyamine are any of the monocarboxylic acids having from 1 to about 40 carbon atoms. These include such acids as acetic, propionic, butyric, valeric, stearic, oleic, eicosoic, and the like. Aromatic acids such as benzoic acid and salicylic acid are also useful.

The alkenylsuccinic acid or anhydride may be one in which the alkenyl portion contains from 8 to about 300 carbon atoms, preferably from about 40 to about 200 carbon atoms. These may be produced by known methods from (1) a monoolefin, such as 1-octene, 1-decene, 1-dodecene, 1-octadecene, and the like or from a polyolefin, which is a polymer of such olefins as ethene, propene, 1-butene, isobutene, 1-hexene, 1-octene, and so forth and (2) maleic anhydride.

As already mentioned, the polyamine is first condensed with a monocarboxylic acid or anhydride. The product of such condensation may be an alkenylsuccinimide amide having the structure (a)
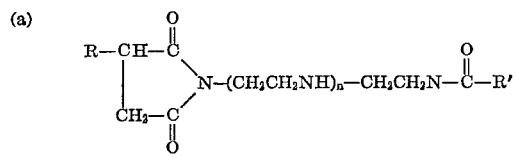

or it may be an alkenylsuccinimide imidazoline product having the structure (b)
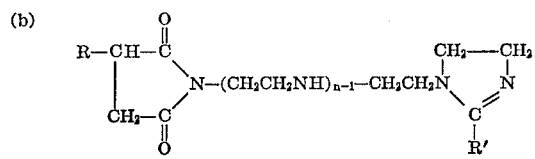

wherein, in (a) and (b), R is the above-defined alkenyl group, $n$ may be from 0 to about 5, and R′, the group attached to the carboxyl group of the monocarboxylic acid, may be hydrogen or an alkyl group of from 1 to about 39 carbon atoms. Additional succinyl groups may be present on the molecule depending upon the mole ratio of anhydride to polyamine. It is believed that the reaction product of these succinic anhydride-polyamine reactions may be actually a mixture of compounds of which the above-described structures are the major or effective components. For this reason, these basic nitrogen-containing products are preferably described by the manner in which they are prepared.

In the two structures shown above, the cyclic succinimide group

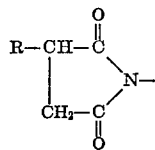

may be opened by reaction in the presence of a metal compound to form the metal salt of the monoamide derivative

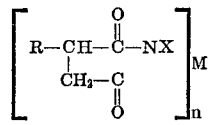

wherein M is the metal, X is the remainder of the succinimide molecule, and $n$ is the valence of the metal. This metal salt of succinamic acid may also be used as a metal-complexing reagent as indicated heretofore.

The metal complex compounds of this invention containing the metal salt are believed to be a complex of the metal salt and the basic organic compound. A salt-forming reaction does not occur since there is no evidence of the anion of the metal salt producing a separate by-product. Moreover, the resulting reaction mixture upon analysis appears to be a single molecule, similar to those existing in the coordinated complexes of the Werner-type. For the purpose of this invention, therefore, the product compounds are referred to herein as coordinated complexes.

As is evident from the foregoing, the alkylene polyamine-acid product may first be reacted with the metal complexing reagent to produce a metallo-imidazoline complex intermediate. The ratio of metal to amine is such as to leave at least one basic nitrogen atom. Then this intermediate is reacted with the alkenylsuccinic acid or anhydride to produce the final oil-soluble metal complex product of this invention. Since the metal-complexing reaction is quite rapid even at room temperature, and also since the oxides, hydroxides and carbonates do not form complexes with the nitrogen-containing compounds, all three reactants may be added together to produce an in situ product, by first mixing the reactants and then heating to form the succinimide.

The base fluids for which the compounds of this invention find utility include gasoline, petroleum products of both lubricating and fuel viscosities, and synthetic fluids. Of the latter class may be included synthetic ester lubricants, such as those formed from monohydric alcohols and dicarboxylic acids, glycols or glycerols with monocarboxylic acids, and pentaerythritols with carboxylic acids, including alcohols having from about 4 to about 20 carbons, and carboxylic acids having from 2 to about 18 carbon atoms. Many synthetic esters may have mixed alcohols or carboxylic acids. Commonly may be included 2-ethylhexyl sebacate, trimethylolpropane trioctanoate, and especially pentaerythritol esters of valeric acid, isovaleric acid, caproic acid, caprylic acid, pelargonic acid, capric acid, and the like. Of special interest is a mixed pentaerythritol ester of an equimolar proportion of commercial valeric acid (containing isovaleric acid) and pelargonic acid. Other synthetic fluids include liquid polyolefins, alkylene oxide fluids, silicone fluids, polyacetals, and simple hydrocarbons of stable fluid viscosities.

In one aspect of this invention, it has been discovered that lubricant compositions containing these complexes possess greater thermal stability, and result in more effective dispersancy in high-output-high-temperature engines than with uncomplexed nitrogen compounds, and yet the compositions retain excellent low temperature detergent qualities.

The following examples illustrate this invention more clearly. All parts and percentages are on a weight basis unless otherwise specified.

EXAMPLE 1

Into a suitable reactor were mixed 503.2 parts of tetraethylene pentamine, and 1125 parts of a solvent-refined process oil. To this mixture 163.2 parts of acetic anhydride was added dropwise. The mass was heated to about 150° C. under a nitrogen gas atmosphere for 2 hours, at 30 mm. Hg pressure, and water was removed.

To the remaining product was added 4500 parts of a polybutenylsuccinic anhydride (wherein the polybutenyl radical has a molecular weight of between 850 and 900). The mixture was stirred for 3 hours at 150° C. and 7 to 9 mm. Hg pressure, under a nitrogen blanket. The product had the following analysis:

|  | Percent |
|---|---|
| Nitrogen | 3.02 |

EXAMPLE 2

This example illustrates the reaction of the product of Example 1 with a zinc organic polyphosphate. The zinc salt is prepared from an organic polyphosphoric acid of the structure

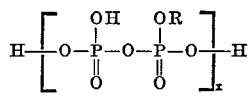

wherein R is an oxy alcohol containing about 12 carbon atoms and $x$ is about 3. The organic portion contains from about 36 to about 48 carbon atoms. 300 parts of the product of Example 1 were mixed with 19 parts of zinc carbonate, 70 parts of the polyphosphoric acid, 50 ml. of distilled water, 33.5 parts of a solvent-refined oil diluent, and the temperature of the mixture was raised to 90° C. The mixture was refluxed for 2 hours. After this, a vacuum of 5 to 10 mm. Hg was applied for one hour at 150° C. The resulting mixture was filtered as before. The clear, brown viscous oil was analyzed with the following results:

|  | Percent |
|---|---|
| Nitrogen | 2.30 |
| Zinc | 1.92 |
| Phosphorus | 1.23 |

EXAMPLE 3

A procedure similar to that of Example 2 was followed except that the zinc salt used was zinc diamylphenyl phosphate prepared in situ. 6.6 parts of zinc carbonate and 35.3 parts of diamylphenol acid phosphate (prepared by the reaction of diamylphenol and $P_2O_5$ in a mole ratio 3:1) were added to 100 parts of the product of Example 1. The reaction mixture containing 11 parts of solvent-refined mineral oil and 25 parts of distilled water, was heated with stirring to 150° C. at 5 mm. Hg for 2 hours and then filtered. The product obtained from the filtration step had the following analysis:

|  | Percent |
|---|---|
| Nitrogen | 2.21 |
| Zinc | 1.49 |

EXAMPLE 4

(a) Into a suitable reaction vessel was placed 4.71 parts of tetraethylene pentamine and 15 parts of a solvent-refined paraffinic oil having an SUV of 100 seconds at 100° F. To this was added 1.52 parts of acetic anhydride with agitation. The mixture was held under a vacuum of about 35 mm. Hg and heated at 150° C. for 30 minutes.

(b) Alkyl ($C_{15}$–$C_{20}$) benzene sulfonic acid (5120 parts), having 1.29 meq./g. total acidity, was degassed at room temperature for two hours by purging with nitrogen. 600 cc. of water was added to the mixture, followed by the addition in one hour at about 50° C. to 300 parts of zinc oxide. The reaction temperature was raised to 100° C. in about one hour while bubbling in nitrogen. Some water was removed in this step. 1540 parts of Promor #5 process oil was added and stripping of water was continued until a temperature of 150° C. was reached (about 2½ hours). Heating and stripping was continued for 3 additional hours at 150° C. under a vacuum of 9 mm. Hg. The product, zinc alkyl ($C_{15}$–$C_{20}$) benzene sulfonate, filtered through Hyflo clay, had the following analysis:

Zinc—calculated 3.60%; found 3.58%.
Sulfur—calculated 3.50%; found 3.22%.

(c) 107 parts of (a), 700 parts of (b) and 427 parts of Promor #5 process oil were placed in a suitable reactor, heated to 150° C. and held there for 2 hours. 1875 parts of polypropenylsuccinic anhydride (prepared from maleic anhydride and polypropene having a molecular weight of 1120) was added and this reaction mixture was heated for 3 hours under a vacuum of 5 mm. of Hg and 150° C. A clear, dark brown product was produced having the following analysis:

Nitrogen—calculated 0.91%; found 0.95%.
Zinc—calculated 0.77%; found 0.78%.
Sulfur—calculated 0.77%; found 0.75%.

The alkylbenzene referred to in part (b) above is a mixture of 60% monoalkyl benzene and 40% dialkyl benzene derived from a mixture of $C_{15}$–$C_{20}$ olefins.

EVALUATION OF PRODUCTS

1-H Caterpillar engine test

This test is performed to evaluate detergency characteristics of a sample oil by rating the quantity of sludge and lacquer deposits in a single cylinder diesel engine operating up to 480 hours. The engine is operated under a steady load and is stopped periodically for oil changes. The fuel used contains 70% of a coastal gas oil, 20% of a Kuwait 650° F. gas oil and 10% of kerosene. The lubricating oil is a straight grade solvent refined SAE 30 oil containing 3.3% of an overbased calcium sulfonate, 1.6% of a barium salt of phosphosulfurized polybutene and 1.14% of zinc O-isopropyl-O-ethylhexyl phosphorodithioate.

The engine is operated under the following conditions:

| Speed, r.p.m. | 1800±10 |
|---|---|
| Intake air temp., °F. | 170±5 |
| Coolant out temp., °F. | 160±5 |
| Oil pressure, p.s.i. | 30±1 |

At the end of the test, the engine is dismantled and various parts thereof, such as the piston and rings, are inspected for dirt, sludge and lacquer deposits. The following results were obtained with the product of Example 4(c) at 2.1% by weight.

| Hours | Piston | Lacquer demerits | Top groove packing, percent |
|---|---|---|---|
| 120 | 99.8 | 0.0 | 1 |
| 240 | 98.4 | 0.7 | 2 |
| 480 | 95.8 | 2.6 | 1 |

It is further contemplated that these additives will be useful in fuels in preventing deposits.

As is well known, fuel oils, particularly distillate fuel oils, such as those used as domestic heating oils and diesel fuels, have a tendency to deteriorate in storage and to form sludge. Also, by the time the fuel oil reaches the consumer, it contains small amounts of foreign substances, such as condensed moisture and particles of rust and dirt, which become entrained in the oil from the tanks and pipes of the fuel distribution system. A serious problem encountered with fuel oils arises from their tendency to deposit the formed sludge and foreign bodies on the screens, filters, nozzles, etc. of burners and engines using them. These deposits cause clogging of these elements which, in turn, necessitates cleaning and repairs. It has been found that this clogging problem can be substantially alleviated by the addition to the fuel oil of minor amounts of chemical additives known as anti-clogging agents, which have the ability to prevent these deposits. The products of the present invention will exhibit excellent anti-clogging action when added to fuel oils.

ANTI SCREEN CLOGGING TEST

The test procedure involves pumping a fuel oil contaminated with 15 grams per 4 liters of a synthetic sludge, composed of 10% carbon, 40% water and 50% fuel oil, through a conventional oil burner screen for two hours. The amount of deposits on the screen at the end of the test is rated on a scale of from 100 to 0, a rating of 100 indicating a perfectly clean screen and a rating of zero representing the sludge deposited by the base fuel containing no additive. The base fuel oil used in the tests comprises 60% catalytically cracked component and 40% straight-run component and has a boiling range of approximately 320° to 640° F. The results of this test are presented below:

| Product added | Amount added, pounds/ 1,000 bbl. | Results |
|---|---|---|
| None | 0 | 0 |
| Example 4(c) | 25 | 97.5 |

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

We claim:
1. A composition comprising a major proportion of a lubricating oil or a hydrocarbon fuel and an amount sufficient to impart detergency properties thereto of a coordinated metal complex product prepared by reacting:
   (a) a basic nitrogen compound obtained by reacting an alkylene polyamine of the formula $H_2N(RNH)_zH$, wherein R is alkylene of from 2 to 5 carbon atoms and z is from 1 to 10 with a member selected from the group consisting of an aliphatic monocarboxylic acid, its anhydride and an aromatic monocarboxylic acid, the members of said group having from 1 to about 40 carbon atoms;
   with
   (b) an alkenylsuccinic acid or anhydride wherein the alkenyl contains from 8 to about 300 carbon atoms; and
   (c) a metal salt prepared from a metal selected from the group consisting of Groups I-B, II-B, IV-A, VI-B and VIII of the Periodic Table and an acid selected from the group consisting of:
      (i) organosulfonic acid having from 1 to about 50 carbon atoms;
      (ii) organophosphorus acid having from 1 to about 300 carbon atoms;
      (iii) sulfamic acid; and
      (iiii) alkenylsuccinamic acid, the alkenyl being as hereinbefore defined;
   said metal salt being reacted with the monocarboxylic acid-polyamine reaction product or the reaction product of its reaction with the alkenylsuccinic acid or anhydride at from about 60° to about 250° C., the mole ratio of metal salt to either of said reaction products being from about 0.5 to about 2 moles.

2. The composition of claim 1 wherein the basic nitrogen compound is obtained by reacting tetraethylene pentamine with acetic anhydride, the alkenylsuccinic compound is polypropenylsuccinic anhydride and the metal salt is zinc alkyl ($C_{15}$–$C_{20}$) benzene sulfonate.

3. The composition of claim 1 wherein the lubricating oil is the major proportion.

4. The composition of claim 1 wherein the hydrocarbon oil is the major proportion.

5. The composition of claim 1 wherein said metal is selected from the group consisting of zinc, tin and nickel.

6. The composition of claim 5 wherein the metal is zinc.

7. The composition of claim 1 wherein the polyamine is tetraethylene pentamine.

8. The composition of claim 1 wherein the acid or anhydride is acetic anhydride.

9. The composition of claim 1 wherein the alkenylsuccinic acid or anhydride is polypropenylsuccinic anhydride.

10. The composition of claim 1 wherein the alkenylsuccinic acid or anhydride is polybutenylsuccinic anhydride.

11. The composite of claim 1 wherein the metal salt is zinc organic polyphosphate containing from about 36 to about 48 carbon atoms.

12. The composition of claim 1 wherein the metal salt is zinc diamylphenyl phosphate.

13. The composition of claim 1 wherein the metal salt is zinc alkyl ($C_{15}$–$C_{20}$) benzene sulfonate.

14. The composition of claim 1 wherein (1) is first reacted with the polyamine-acid reaction product.

15. The composition of claim 1 wherein (2) is first reacted with the polyamine-acid reaction product.

References Cited
UNITED STATES PATENTS

| | | | |
|---|---|---|---|
| 3,502,677 | 3/1970 | Le Suer | 252—32.5 |
| 3,451,931 | 6/1969 | Kahn et al. | 252—32.5 |
| 3,216,936 | 11/1965 | Le Suer | 252—32.5 |
| 3,624,115 | 11/1971 | Otto et al. | 252—33.6 |

DANIEL E. WYMAN, Primary Examiner

I. VAUGHN, Assistant Examiner

U.S. Cl. X.R.

44—63, 68, 69; 252—32.7 H C, 32.7 E, 33, 33.6

PO-1050
(5/69)

UNITED STATES PATENT OFFICE
CERTIFICATE OF CORRECTION

Patent No. 3808131    Dated April 30, 1974

Inventor(s) Ferdinand P. Otto and Andreas Logothetis

It is certified that error appears in the above-identified patent and that said Letters Patent are hereby corrected as shown below:

Col. 5, line 67, "to" should be -- of --.

Col. 8, line 15, (claim 4), "oil" should be -- fuel --.

Col. 8, line 30, (claim 11), "composite" should be -- composition --.

Signed and sealed this 1st day of October 1974.

(SEAL)
Attest:

McCOY M. GIBSON JR.
Attesting Officer

C. MARSHALL DANN
Commissioner of Paten